United States Patent [19]

Wirth et al.

[11] Patent Number: 5,244,949
[45] Date of Patent: Sep. 14, 1993

[54] STABILIZED CHLORINE-CONTAINING POLYMERS

[75] Inventors: Hermann O. Wirth, Bensheim; Hans J. Sander, Lorsch; Olaf-René Hartmann, Bensheim, all of Fed. Rep. of Germany

[73] Assignee: Ciba-Geigy Corporation, Ardsley, N.Y.

[21] Appl. No.: 797,491

[22] Filed: Nov. 22, 1991

[30] Foreign Application Priority Data

Nov. 30, 1990 [CH] Switzerland ............... 3800/90

[51] Int. Cl.⁵ ................................. C08K 5/34
[52] U.S. Cl. ..................... 524/100; 524/102; 524/330; 524/357; 524/399
[58] Field of Search .......... 524/100, 102, 330, 357, 524/399

[56] References Cited

U.S. PATENT DOCUMENTS

| | | | |
|---|---|---|---|
| 4,102,839 | 7/1978 | Crochemore et al. | 524/357 |
| 4,421,886 | 12/1983 | Worschech et al. | 524/310 |
| 4,692,486 | 9/1987 | Gugumus | 524/102 |
| 4,751,261 | 6/1988 | Miyata et al. | 524/357 |
| 4,822,833 | 4/1989 | Zappia et al. | 524/102 |
| 4,908,398 | 3/1990 | Li Bassi et al. | 524/102 |
| 4,929,652 | 5/1990 | Gugumus | 524/91 |
| 5,010,123 | 4/1991 | Worschech et al. | 524/120 |
| 5,037,870 | 8/1991 | Gugumus | 524/102 |
| 5,049,602 | 9/1991 | Hildebrand | 524/95 |
| 5,070,128 | 12/1991 | Gay | 524/357 |
| 5,071,898 | 12/1991 | Wirth et al. | 524/357 |

FOREIGN PATENT DOCUMENTS

| | | |
|---|---|---|
| 57-168933 | 10/1982 | Japan . |
| 61-163965 | 7/1986 | Japan . |
| 63-178155 | 7/1988 | Japan . |
| 1-299854 | 12/1989 | Japan . |

*Primary Examiner*—Kriellion S. Morgan
*Attorney, Agent, or Firm*—Luther A. R. Hall

[57] ABSTRACT

Chlorine-containing polymers can be stabilised against thermal and actinic degradation by addition of a sterically hindered amine and a zinc compound in the absence of other organometallic compounds. It is preferred additionally to add a 1,3-dicarbonyl compound.

16 Claims, No Drawings

STABILIZED CHLORINE-CONTAINING POLYMERS

The invention relates to stabilised chlorine-containing polymer compositions which contain a sterically hindered amine in combination with a zinc compound.

It is known that sterically hindered amines, for example derivatives of 2,2,6,6-tetramethylpiperidine, are excellent stabilisers for polymers against damage by short-wave light. However, addition of sterically hindered amines of this type to polyvinyl chloride or other chlorine-containing polymers frequently results in discoloration during processing or on use. Only addition of costabilisers allows this discoloration to be prevented or reduced.

Thus, JP-A-82/168 933 describes films made from plasticised polyvinyl chloride which are protected against light by means of a sterically hindered amine and a UV absorber and contain, as costabilisers, zinc stearate, barium stearate and epoxidised soya oil. JP-A-86/163 965 describes the stabilisation of PVC by means of a sterically hindered amine and a calcium/zinc stabiliser or an organotin compound.

JP-A-88/178 155 likewise describes the stabilisation of PVC by means of a hindered amine and calcium stearate, zinc stearate and an organotin compound. EP-A-237 485 recommends a combination of sterically hindered amines and organotin stabilisers for stabilising rigid PVC, with further possible additives being titanium dioxide and calcium stearate.

EP-A-421 933 proposes a combination of sterically hindered amines and zinc compounds and a hydrotalcite for stabilising chlorine-containing polymers, where further possible additives are 1,3-diketones and calcium compounds.

EP-A-432 096 proposes a combination of sterically hindered amines and zinc compounds and a blowing agent or foaming agent, it also being possible to use calcium compounds and 1,3-diketones.

It has now been found that combinations of sterically hindered amines with zinc compounds give very good thermostability even without a second metal compound and without a hydrotalcite and without a blowing agent.

The invention therefore relates to a stabilised chlorine-containing polymer composition comprising a) at least one chlorine-containing polymer,
b) at least one sterically hindered amine, and
c) at least one organic or inorganic zinc compound, but no organometallic carboxylates, no hydrotalcite compounds and no blowing agents or foaming agents.

The polymer composition preferably additionally contains d) at least one 1,3-dicarbonyl compound. This 1,3-dicarbonyl compound may also be in the form of a chelate of one of the divalent metals zinc, calcium, magnesium and barium.

The chlorine-containing polymer may be, for example, a homopolymer or copolymer of vinyl chloride or of vinylidene chloride or a post-chlorinated polymer or copolymer of vinyl chloride or of vinylidene chloride, a chlorinated polyolefin, for example a chlorinated polyethylene, a chlorinated polymer or copolymer of styrene or of butadiene or a chlorinated rubber or a rubber hydrochloride, or a mixture of a chlorine-containing polymer of this type and another chlorine-containing or chlorine-free polymer. The chlorine-containing polymer is preferably a polyvinyl chloride or a copolymer containing at least 80% of vinyl chloride or a mixture (polyblend) of a polymer of this type with another chlorine-containing or chlorine-free polymer. The chlorine-containing polymer may be an emulsion, suspension or bulk polymer.

The sterically hindered amine is preferably a polyalkylpiperidine derivative and preferably contains at least one group of the formula I

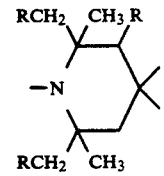

in which R is hydrogen or methyl, and is in particular a derivative of 2,2,6,6-tetramethylpiperidine of the formula I in which R is hydrogen. These compounds are preferably substituted in the 4-position of the piperidine ring by one or two polar groups or by one spiro ring system. These compounds may be low-molecular-weight or oligomeric or polymeric compounds.

The following classes of polyalkylpiperidines are particularly important:

a) Compounds of the formula II

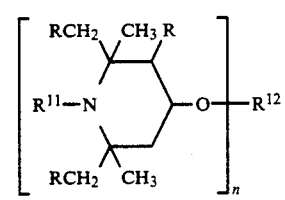

in which n is a number from 1 to 4, preferably 1 or 2, R is hydrogen or methyl, $R^{11}$ is hydrogen, oxyl, hydroxyl, $C_1$–$C_{12}$alkyl, $C_3$–$C_8$alkenyl, $C_3$–$C_8$alkynyl, $C_7$–$C_{12}$aralkyl, $C_1$–$C_{18}$alkoxy, $C_5$–$C_8$cycloalkoxy, $C_7$–$C_9$-phenylalkoxy, $C_1$–$C_8$alkanoyl, $C_3$–$C_5$alkenoyl, $C_1$–$C_{18}$alkanoyloxy, benzyloxy, glycidyl or a —CH$_2$CH(OH)—Z group in which Z is hydrogen, methyl or phenyl, $R^{11}$ preferably being H, $C_1$–$C_4$alkyl, allyl, benzyl, acetyl or acryloyl, and $R^{12}$, if n is 1, is hydrogen, $C_1$–$C_{18}$alkyl, which may be interrupted by one or more oxygen atoms, cyanoethyl, benzyl, glycidyl, a monovalent radical of an aliphatic, cycloaliphatic, araliphatic, unsaturated or aromatic carboxylic acid, carbamic acid or phosphorus-containing acid, or a monovalent silyl radical, preferably a radical of an aliphatic carboxylic acid having 2 to 18 carbon atoms, of a cycloaliphatic carboxylic acid having 7 to 15 carbon atoms, of an α, β-unsaturated carboxylic acid having 3 to 5 carbon atoms or of an aromatic carboxylic acid having 7 to 15 carbon atoms; if n is 2, $R^{12}$ is $C_1$–$C_{12}$alkylene, $C_4$–$C_{12}$alkenylene, xylylene, a divalent radical of an aliphatic, cycloaliphatic, araliphatic or aromatic dicarboxylic acid, dicarbamic acid or phosphorus-containing acid, or a divalent silyl radical, preferably a radical of an aliphatic dicarboxylic acid having 2 to 36 carbon atoms, of a cycloaliphatic or aromatic dicarboxylic acid having 8 to 14 carbon atoms or of an aliphatic, cycloaliphatic or aromatic dicarbamic acid having 8 to 14 carbon atoms; if n is 3, $R^{12}$ is a trivalent radical of an aliphatic, cycloaliphatic or aromatic tricarboxylic acid, of an aromatic tricarbamic acid or of a phosphorus-containing acid, or a trivalent silyl radical; and if n is 4, $R^{12}$ is a tetravalent radical of an aliphatic, cycloaliphatic or aromatic tetracarboxylic acid.

Any $C_1$-$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

$C_1$-$C_{18}$alkyl $R^{11}$ or $R^{12}$ is, for example, one of the abovementioned groups or, for example, n-tridecyl, n-tetradecyl, n-hexadecyl or n-octadecyl.

$C_3$-$C_8$alkenyl $R^{11}$ may be, for example, 1-propenyl, allyl, methallyl, 2-butenyl, 2-pentenyl, 2-hexenyl, 2-octenyl or 4-tert-butyl-2-butenyl.

$C_3$-$C_8$alkynyl $R^{11}$ is preferably propargyl.

$C_7$-$C_{12}$aralkyl $R^{11}$ is, in particular, phenethyl or especially benzyl.

$C_1$-$C_8$alkanoyl $R^{11}$ is, for example, formyl, propionyl, butyryl or octanoyl, preferably acetyl, and $C_3$-$C_5$alkenoyl $R^{11}$ is, in particular, acryloyl.

A monovalent carboxylic acid radical $R^{12}$ is, for example, an acetic acid, caproic acid, stearic acid, acrylic acid, methacrylic acid, benzoic acid or β-(3,5-di-tert-butyl-4-hydroxyphenyl)propionic acid radical.

A divalent dicarboxylic acid radical $R^{12}$ is, for example, a malonic acid, succinic acid, glutaric acid, adipic acid, suberic acid, sebacic acid, maleic acid, itaconic acid, phthalic acid, dibutylmalonic acid, dibenzylmalonic acid, butyl(3,5-di-tert-butyl-4-hydroxybenzyl)malonic acid or bicycloheptenedicarboxylic acid radical.

A trivalent tricarboxylic acid radical $R^{12}$ is, for example, a trimellitic acid, citric acid or nitrilotriacetic acid radical.

A tetravalent tetracarboxylic acid radical $R^{12}$ is, for example, the tetravalent radical of butane-1,2,3,4-tetracarboxylic acid or of pyromellitic acid.

A divalent dicarbamic acid radical $R^{12}$ is, for example, a hexamethylenedicarbamic acid or 2,4-toluylenedicarbamic acid radical.

Preference is given to compounds of the formula II in which R is hydrogen, $R^{11}$ is hydrogen or methyl, n is 2 and $R^{12}$ is the diacyl radical of an aliphatic dicarboxylic acid having 4 to 12 carbon atoms.

The following are examples of polyalkylpiperidine compounds of this class:

1) 4-hydroxy-2,2,6,6-tetramethylpiperidine
2) 1-allyl-4-hydroxy-2,2,6,6-tetramethylpiperidine
3) 1-benzyl-4-hydroxy-2,2,6,6-tetramethylpiperidine
4) 1-(4-tert-butyl-2-butenyl)-4-hydroxy-2,2,6,6-tetramethylpiperidine
5) 4-stearoyloxy-2,2,6,6-tetramethylpiperidine
6) 1-ethyl-4-salicyloyloxy-2,2,6,6-tetramethylpiperidine
7) 4-methacryloyloxy-1,2,2,6,6-pentamethylpiperidine
8) 1,2,2,6,6-pentamethylpiperidin-4-yl β-(3,5-di-tert-butyl-4-hydroxyphenyl)propionate
9) di(1-benzyl-2,2,6,6-tetramethylpiperidin-4-yl)maleate
10) di(2,2,6,6-tetramethylpiperidin-4-yl)succinate
11) di(2,2,6,6-tetramethylpiperidin-4-yl)glutarate
12) di(2,2,6,6-tetramethylpiperidin-4-yl)adipate
13) di(2,2,6,6-tetramethylpiperidin-4-yl)sebacate
14) di(1,2,2,6,6-pentamethylpiperidin-4-yl)sebacate
15) di(1,2,3,6-tetramethyl-2,6-diethyl-piperidin-4-yl)sebacate
16) di(1-allyl-2,2,6,6-tetramethylpiperidin-4-yl)phthalate
17) 1-hydroxy-4-β-cyanoethyloxy-2,2,6,6-tetramethylpiperidine
18) 1-acetyl-2,2,6,6-tetramethylpiperidin-4-yl acetate
19) tri(2,2,6,6-tetramethylpiperidin-4-yl) trimellitate
20) 1-acryloyl-4-benzyloxy-2,2,6,6-tetramethylpiperidine
21) di(2,2,6,6-tetramethylpiperidin-4-yl) diethylmalonate
22) di(1,2,2,6,6-pentamethylpiperidin-4-yl) dibutylmalonate
23) di(1,2,2,6,6-pentamethylpiperidin-4-yl) butyl(3,5-di-tert-butyl-4-hydroxybenzyl) malonate
24) di(1-octyloxy-2,2,6,6-tetramethylpiperidin-4-yl) sebacate
25) di(1-cyclohexyloxy-2,2,6,6-tetramethylpiperidin-4-yl) sebacate
26) hexane-1',6'-bis(4-carbamoyloxy-1-n-butyl-2,2,6,6-tetramethylpiperidine)
27) toluene-2',4'-bis(4-carbamoyloxy-1-n-propyl-2,2,6,6-tetramethylpiperidine)
28) tetra(2,2,6,6-tetramethylpiperidin-4-yl) butanetetracarboxylate
29) tetra(1,2,2,6,6-pentamethylpiperidin-4-yl) butanetetracarboxylate
30) tris(1-propyl-2,2,6,6-tetramethylpiperidin-4-yl) phosphite
31) tris(1-propyl-2,2,6,6-tetramethylpiperidin-4-yl) phosphate
32) phenyl bis-(1,2,6,6-pentamethylpiperidin-4-yl) phosphonate
33) 4-hydroxy-1,2,2,6,6-pentamethylpiperidine
34) 4-hydroxy-N-hydroxyethyl-2,2,6,6-tetramethylpiperidine
35) 4-hydroxy-N-(2-hydroxypropyl)-2,2,6,6-tetramethylpiperidine
36) 1-glycidyl-4-hydroxy-2,2,6,6-tetramethylpiperidine b) Compounds of the formula III,

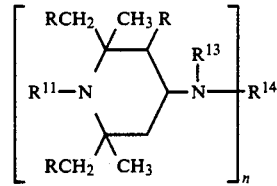

in which n is the number 1 or 2, R and $R^{11}$ are as defined under a), $R^{13}$ is hydrogen, $C_1$-$C_{12}$alkyl, $C_2$-$C_5$hydroxyalkyl, $C_5$-$C_7$cycloalkyl, $C_7$-$C_8$aralkyl, $C_2$-$C_{18}$alkanoyl, $C_3$-$C_5$alkenoyl, benzoyl or a group of the formula

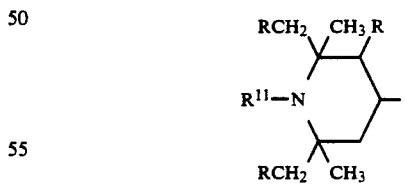

and, if n is 1, $R^{14}$ is hydrogen, $C_1$-$C_{18}$alkyl, $C_3$-$C_8$alkenyl, $C_5$-$C_7$cycloalkyl, $C_1$-$C_4$alkyl which is substituted by a hydroxyl, cyano, alkoxycarbonyl or carbamide group, glycidyl, a group of the formula —$CH_2$—CH(OH)—Z or of the formula —CONH—Z in which Z is hydrogen, methyl or phenyl; if n is 2, $R^{14}$ is $C_2$-$C_{12}$alkylene, $C_6$-$C_{12}$arylene, xylylene, a —$CH_2$—CH(OH)—$CH_2$ group or a —$CH_2$—CH(OH)—$CH_2$—O—D—O— group in which D is $C_2$-$C_{10}$alkylene, $C_6$-$C_{15}$arylene or $C_6$-$C_{12}$cycloalkylene, or, with the proviso that $R^{13}$ is not alkanoyl, alkenoyl or benzoyl, $R^{14}$ is alternatively a divalent radical of an aliphatic, cycloaliphatic or aromatic dicarboxylic acid or dicarbamic acid or may alternatively be the —CO— group, or, if n is 1, $R^{13}$ and $R^{14}$ together may be the divalent radical of an aliphatic, cycloaliphatic or aromatic 1,2- or 1,3-dicarboxylic acid.

Any $C_1$–$C_{12}$alkyl or $C_1$–$C_{18}$alkyl substituents are as defined above under a).

Any $C_5$–$C_7$cycloalkyl substituents are, in particular, cyclohexyl.

$C_7$–$C_8$aralkyl $R^{13}$ is, in particular, phenylethyl or especially benzyl.

$C_2$–$C_5$hydroxyalkyl $R^{13}$ is, in particular, 2-hydroxyethyl or 2-hydroxypropyl.

$C_2$–$C_{18}$alkanoyl $R^{13}$ is, for example, propionyl, butyryl, octanoyl, dodecanoyl, hexadecanoyl or octadecanoyl, but preferably acetyl, and $C_3$–$C_5$alkenoyl $R^{13}$ is, in particular, acryloyl.

$C_2$–$C_8$alkenyl $R^{14}$ is, for example, allyl, methallyl, 2-butenyl, 2-pentenyl, 2-hexenyl or 2-octenyl.

$C_1$–$C_4$alkyl $R^{14}$ which is substituted by a hydroxyl, cyano, alkoxycarbonyl or carbamide group may be, for example, 2-hydroxyethyl, 2-hydroxypropyl, 2-cyanoethyl, methoxycarbonylmethyl, 2-ethoxycarbonylethyl, 2-aminocarbonylpropyl or 2-(dimethylaminocarbonyl)ethyl.

Any $C_2$–$C_{12}$alkylene substituents are, for example, ethylene, propylene, 2,2-dimethylpropylene, tetramethylene, hexamethylene, octamethylene, decamethylene or dodecamethylene.

Any $C_6$–$C_{15}$arylene substituents are, for example, o-, m- or p-phenylene, 1,4-naphthylene or 4,4'-diphenylene.

$C_6$–$C_{12}$cycloalkylene D is, in particular, cyclohexylene.

Preference is given to compounds of the formula III in which n is 1 or 2, R is hydrogen, $R^{11}$ is hydrogen or methyl, $R^{13}$ is hydrogen, $C_1$–$C_{12}$alkyl or a group of the formula

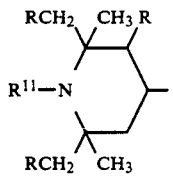

and, if n is 1, $R^{14}$ is hydrogen or $C_1$–$C_{12}$alkyl and, if n is 2, $R^{14}$ is $C_2$–$C_8$alkylene.

The following are examples of polyalkylpiperidine compounds of this class:
37) N,N'-bis(2,2,6,6-tetramethylpiperidin-4-yl)hexamethylene1,6-diamine
38) N,N'-bis(2,2,6,6-tetramethylpiperidin-4-yl)hexamethylene1,6-diacetamide
39) bis(2,2,6,6-tetramethylpiperidin-4-yl)amine
40) 4-benzoylamino-2,2,6,6-tetramethylpiperidine
41) N,N'-bis(2,2,6,6-tetramethylpiperidin-4-yl)-N,N'dibutyladipamide
42) N,N'-bis(2,2,6,6-tetramethylpiperidin-4-yl)-N,N'dicyclohexyl-2-hydroxypropylene-1,3-diamine
43) N,N'-bis(2,2,6,6-tetramethylpiperidin-4-yl)-p-xylylenediamine
44) N,N'-bis(2,2,6,6-tetramethylpiperidin-4-yl)-succinamide
45) di(2,2,6,6-tetramethylpiperidin-4-yl) N-(2,2,6,6-tetramethylpiperidin-4-yl)-β-aminodipropionate
46) The compound of the formula

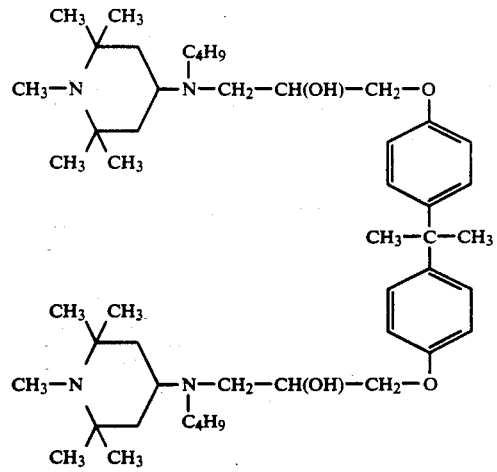

47) 4-(bis-2-hydroxyethylamino)-1,2,2,6,6-pentamethylpiperidine
48) 4-(3-methyl-4-hydroxy-5-tert-butylbenzamido)-2,2,6,6-tetramethylpiperidine
49) 4-methacrylamido-1,2,2,6,6-pentamethylpiperidine c) Compounds of the formula IV

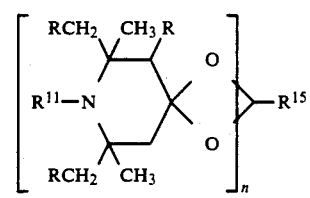

in which n is the number 1 or 2, R and $R^{11}$ are as defined under a), and, if n is 1, $R^{15}$ is $C_2$–$C_8$alkylene, $C_2$–$C_8$hydroxyalkylene or $C_4$–$C_{22}$acyloxyalkylene, and, if n is 2, $R^{15}$ is the $(-CH_2)_2C(CH_2-)_2$ group.

$C_2$–$C_8$alkylene or $C_2$–$C_8$hydroxyalkylene $R^{15}$ is, for example, ethylene, 1-methylethylene, propylene, 2-ethylpropylene or 2-ethyl-2-hydroxymethylpropylene.

$C_4$–$C_{22}$acyloxyalkylene $R^{15}$ is, for example, 2-ethyl-2-acetoxymethylpropylene.

The following are examples of polyalkylpiperidine compounds of this class:
50) 9-aza-8,8,10,10-tetramethyl-1,5-dioxaspiro[5.5]undecane
51) 9-aza-8,8,10,10-tetramethyl-3-ethyl-1,5-dioxaspiro[5.5]undecane
52) 8-aza-2,7,7,8,9,9-hexamethyl-1,4-dioxaspiro[4.5]decane
53) 9-aza-3-hydroxymethyl-3-ethyl-8,8,9,10,10-pentamethyl1,5-dioxaspiro[5.5]undecane
54) 9-aza-3-ethyl-3-acetoxymethyl-9-acetyl-8,8,10,10tetramethyl-1,5-dioxaspiro[5.5]undecane
55) 2,2,6,6-tetramethylpiperidine-4-spiro-2'-(1',3'-dioxane)-5'-spiro-5''-(1'',3''-dioxane)-2''-spiro-4'''-(2''',2''',6''',6'''tetramethylpiperidine).

d) Compounds of the formulae VA, VB and VC

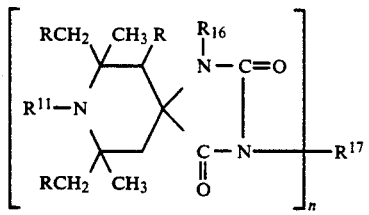

VA

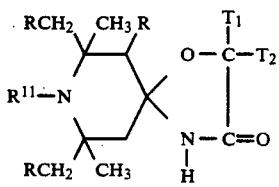

VB

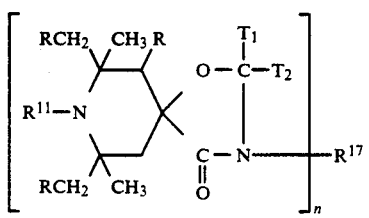

VC in which n is the number 1 or 2, R and $R^{11}$ are as defined under a), $R^{16}$ is hydrogen, $C_1$–$C_{12}$alkyl, allyl, benzyl, glycidyl or $C_2$–$C_6$alkoxyalkyl, and, if n is 1, $R^{17}$ is hydrogen, $C_1$–$C_{12}$alkyl, $C_3$–$C_5$alkenyl, $C_7$–$C_9$aralkyl, $C_5$–$C_7$cycloalkyl, $C_2$–$C_4$hydroxyalkyl, $C_2$–$C_6$alkoxyalkyl, $C_6$–$C_{10}$aryl, glycidyl or a group of the formula —$(CH_2)_p$—COO—Q or of the formula —$(CH_2)_p$—O—CO—Q in which p is 1 or 2 and Q is $C_1$–$C_4$alkyl or phenyl, and, if n is 2, $R^{17}$ is $C_2$–$C_{12}$alkylene, $C_4$–$C_{12}$alkenylene, $C_6$–$C_{12}$arylene, a —$CH_2$—CH(OH)—$CH_2$—O—D—O—$CH_2$—CH(OH)—$CH_2$— group in which D is $C_2$–$C_{10}$alkylene, $C_6$–$C_{15}$arylene or $C_6$–$C_{12}$cycloalkylene, or $R^{17}$ is a —$CH_2CH(OZ')CH_2$—($OCH_2$—$CH(OZ')CH_2$)$_2$— group in which Z' is hydrogen, $C_1$–$C_{18}$alkyl, allyl, benzyl, $C_2$–$C_{12}$alkanoyl or benzoyl, $T_1$ and $T_2$, independently of one another, are hydrogen, $C_1$–$C_{18}$alkyl or unsubstituted or halogen- or $C_1$–$C_4$alkyl-substituted $C_6$–$C_{10}$aryl or $C_7$–$C_9$aralkyl, or $T_1$ and $T_2$, together with the carbon atom connecting them, form a $C_5$–$C_{12}$cycloalkane ring.

Any $C_1$–$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any $C_1$–$C_{18}$alkyl substituents may be, for example, the abovementioned groups or, for example, n-tridecyl, n-tetradecyl, n-hexadecyl or n-octadecyl.

Any $C_2$–$C_6$alkoxyalkyl substituents are, for example, methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

$C_3$–$C_5$alkenyl $R^{17}$ is, for example, 1-propenyl, allyl, methallyl, 2-butenyl or 2-pentenyl.

$C_7$–$C_9$aralkyl $R^{17}$, $T_1$ and $T_2$ are, in particular, phenethyl or especially benzyl. If $T_1$ and $T_2$, together with the carbon atom, form a cycloalkane ring, this may be, for example, a cyclopentane, cyclohexane, cyclooctane or cyclododecane ring.

$C_2$–$C_4$hydroxyalkyl $R^{17}$ is, for example, 2-hydroxyethyl, 2-hydroxypropyl, 2-hydroxybutyl or 4-hydroxybutyl.

$C_6$–$C_{10}$aryl $R^{17}$, $T_1$ and $T_2$ are, in particular, phenyl, α- or β-naphthyl, unsubstituted or substituted by halogen or $C_1$–$C_4$alkyl.

$C_2$–$C_{12}$alkylene $R^{17}$ is, for example, ethylene, propylene, 2,2-dimethylpropylene, tetramethylene, hexamethylene, octamethylene, decamethylene or dodecamethylene.

$C_4$–$C_{12}$alkenylene $R^{17}$ is, in particular, 2-butenylene, 2-pentenylene or 3-hexenylene.

$C_6$–$C_{12}$arylene $R^{17}$ is, for example, o-, m- or p-phenylene, 1,4-naphthylene or 4,4'-diphenylene.

$C_2$–$C_{12}$alkanoyl Z' is, for example, propionyl, butyryl, octanoyl or dodecanoyl, but preferably acetyl.

$C_2$–$C_{10}$alkylene, $C_6$–$C_{15}$arylene or $C_6$–$C_{12}$cycloalkylene D is as defined under b).

The following are examples of polyalkylpiperidine compounds from this class:

56) 3-benzyl-1,3,8-triaza-7,7,9,9-tetramethylspiro[4.5]decane 2,4-dione
57) 3-n-octyl-1,3,8-triaza-7,7,9,9-tetramethylspiro[4.5]decane-2,4-dione
58) 3-allyl-1,3,8-triaza-1,7,7,9,9-pentamethylspiro[4.5]decane-2,4-dione
59) 3-glycidyl-1,3,8-triaza-7,7,8,9,9-pentamethylspiro[4.5]decane-2,4-dione
60) 1,3,7,7,8,9,9-heptamethyl-1,3,8-triazaspiro[4.5]decane-2,4-dione
61) 2-isopropyl-7,7,9,9-tetramethyl-1-oxa-3,8-diaza-4-oxospiro[4.5]decane
62) 2,2-dibutyl-7,7,9,9-tetramethyl-1-oxa-3,8-diaza-4-oxospiro[4.5]decane
63) 2,2,4,4-tetramethyl-7-oxa-3,20-diaza-21-oxodispiro[5.1.11.2]heneicosane
64) 2-butyl-7,7,9,9-tetramethyl-1-oxa-4,8-diaza-3-oxospiro[4,5]decane
65) 8-acetyl-3-dodecyl-1,3,8-triaza-7,7,9,9-tetramethylspiro[4,5]decane-2,4-dione or the compounds of the formulae below:

66)

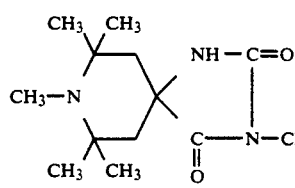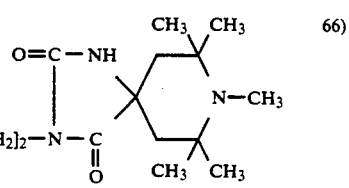

67)

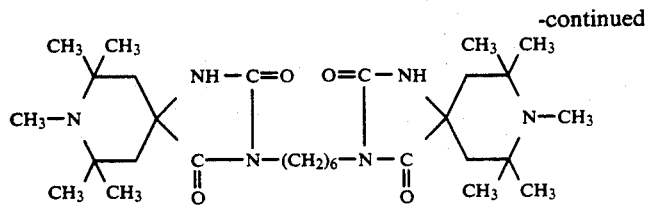

68)

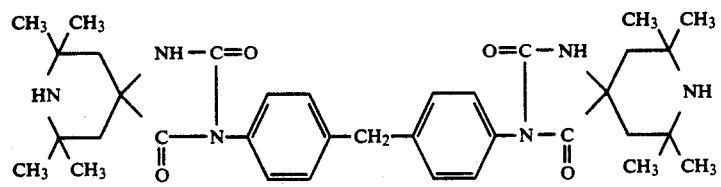

69)

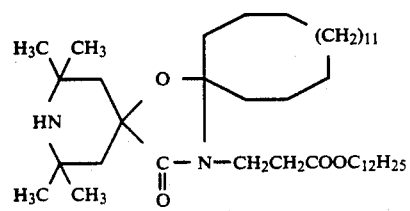

e) Compounds of the formula VI,

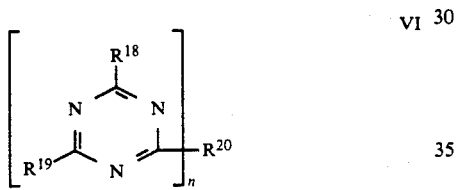 VI in which n is the number 1 or 2, and $R^{18}$ is a group of the formula

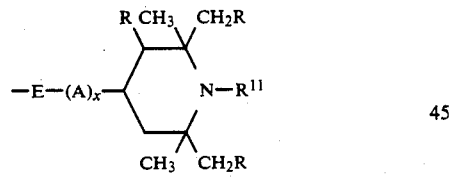

in which R and $R^{11}$ are as defined under a), E is —O— or —NR$^{21}$—, A is $C_2$–$C_6$alkylene or —(CH$_2$)$_3$—O—, and x is the number 0 or 1, $R^{19}$ is identical to $R^{18}$ or one of the groups —NR$^{21}$R$^{22}$, —OR$^{23}$, —NHCH$_2$OR$^{23}$ or —N(CH$_2$OR$^{23}$)$_2$, $R^{20}$, if n is 1, is identical to $R^{18}$ or $R^{19}$ and, if n is 2, is an —E—B—E— group in which B is $C_2$–$C_6$alkylene which may be interrupted by —N(R$^{21}$)—, $R^{21}$ is $C_1$–$C_{12}$alkyl, cyclohexyl, benzyl, $C_1$–$C_4$hydroxyalkyl or a group of the formula

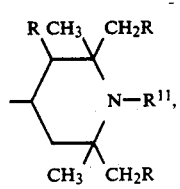

$R^{22}$ is $C_1$–$C_{12}$alkyl, cyclohexyl, benzyl or $C_1$–$C_4$hydroxyalkyl, and $R^{23}$ is hydrogen, $C_1$–$C_{12}$alkyl or phenyl, or $R^{21}$ and $R^{22}$ together are $C_4$–$C_5$alkylene or $C_4$–$C_5$oxaalkylene, for example

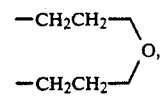

or a group of the formula 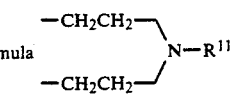

or $R^{21}$ and $R^{22}$ are alternatively each a group of the formula

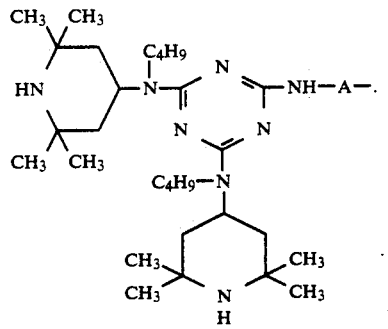

Any $C_1$–$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any $C_1$–$C_4$hydroxyalkyl substituents are, for example, 2-hydroxyethyl, 2-hydroxypropyl, 3-hydroxypropyl, 2-hydroxybutyl or 4-hydroxybutyl.

$C_2$–$C_6$alkylene A is, for example, ethylene, propylene, 2,2-dimethylpropylene, tetramethylene or hexamethylene.

If $R^{21}$ and $R^{22}$ together are $C_4$–$C_5$alkylene or $C_4$–$C_5$oxaalkylene, this is, for example, tetramethylene, pentamethylene or 3-oxapentamethylene.

Preference is given to compounds of the formula VI in which n is 4, $R^{18}$ and $R^{19}$ are a
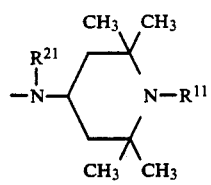
group in which $R^{11}$ is hydrogen or methyl and $R^{21}$ is hydrogen or $C_1$-$C_6$alkyl, and $R^{20}$ is a tetravalent radical of an aliphatic tetramine.
The following are examples of polyalkylpiperidine compounds from class e):
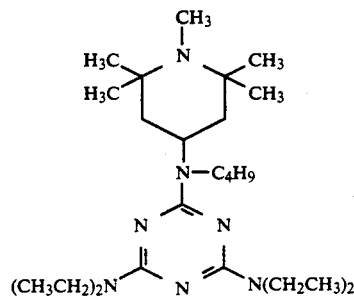
70)
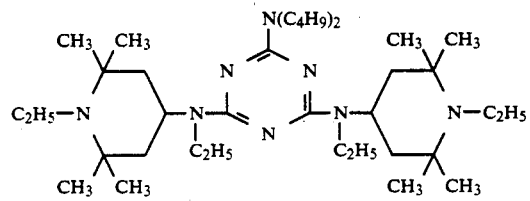
71)
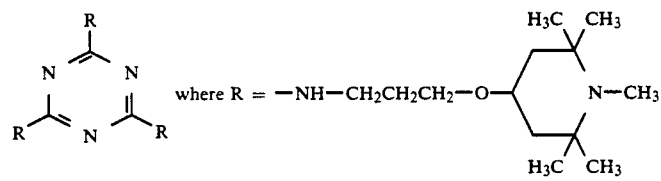
72)
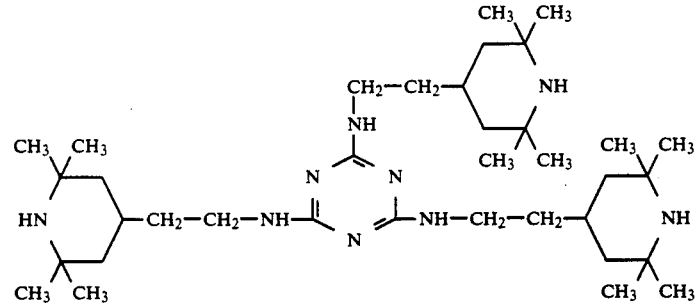
73)
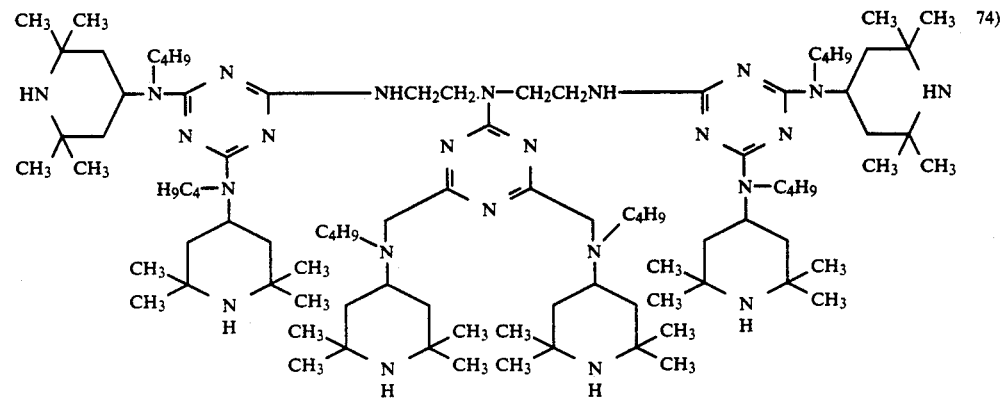
74)

75)
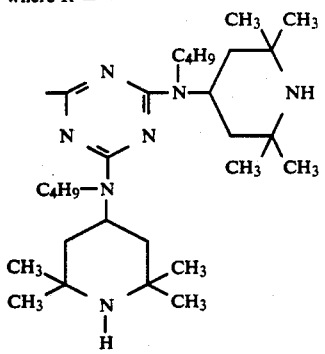
76)
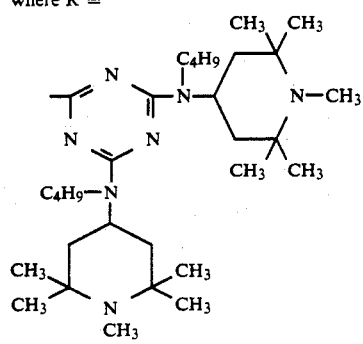
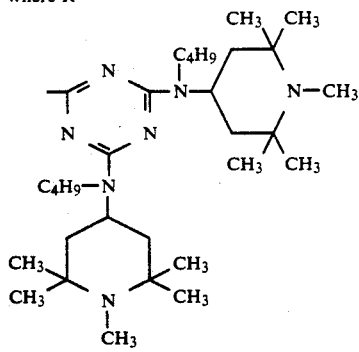
78)
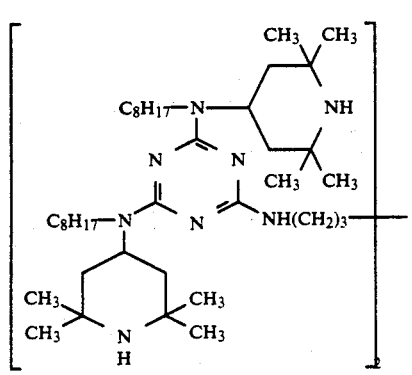

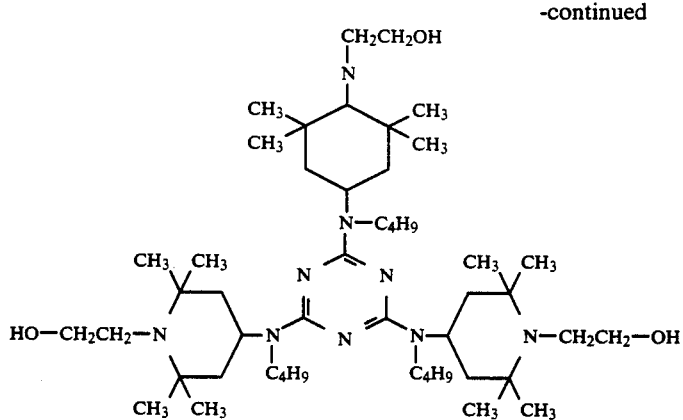

79)

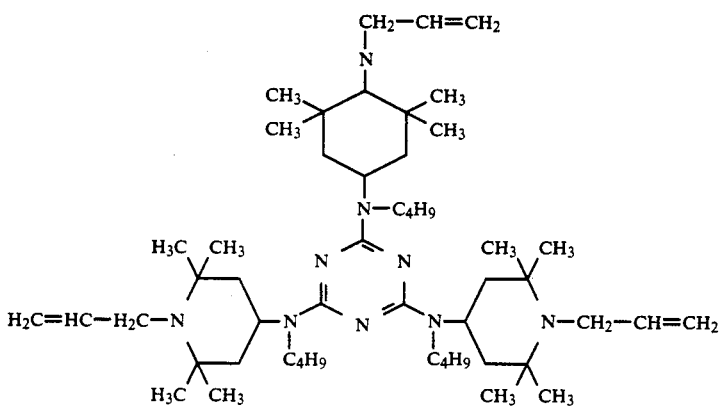

80)

f) Oligomeric or polymeric compounds whose recurring structural unit contains a polyalkylpiperidine radical of the formula (I), in particular polyesters, polyethers, polyamides, polyamines, polyurethanes, polyureas, polyaminotriazines, poly(meth)acrylates, poly(meth)acrylamides, and copolymers thereof which contain these radicals. Of these, the polyesters and polyaminotriazines are preferred.

Examples of 2,2,6,6-polyalkylpiperdine light stabilisers from this class are compounds of the formulae below, in which m is a number from 2 to about 200.

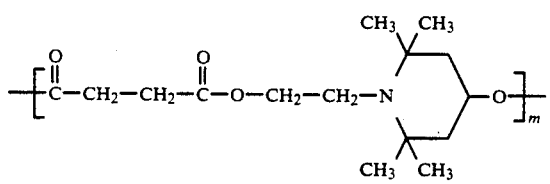

81)

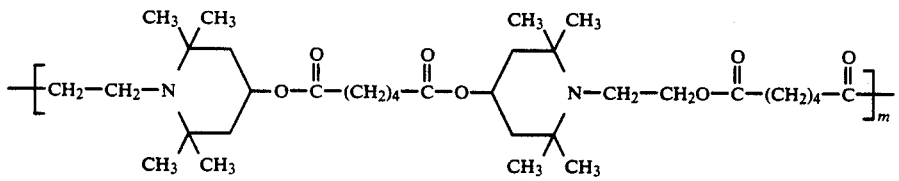

82)

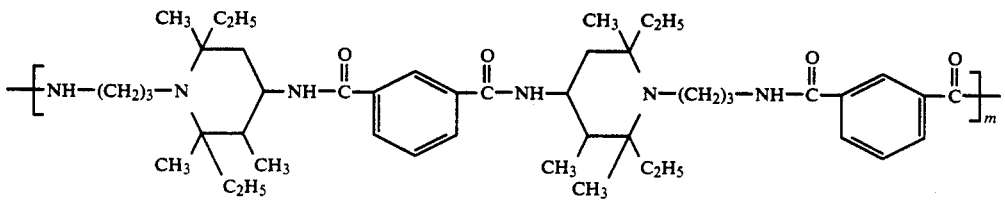

83)

-continued
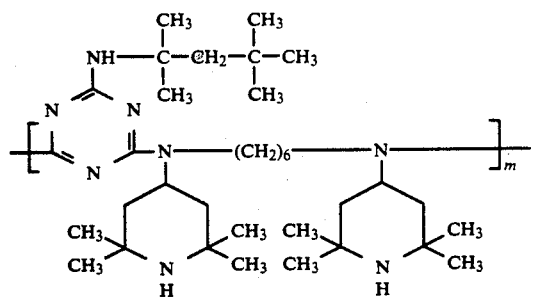
84)
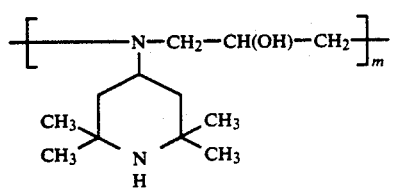
85)
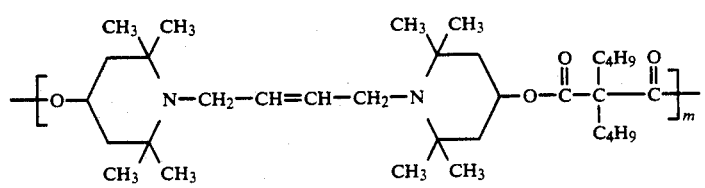
86)
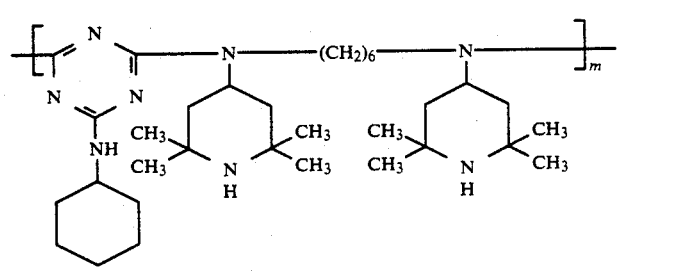
87)
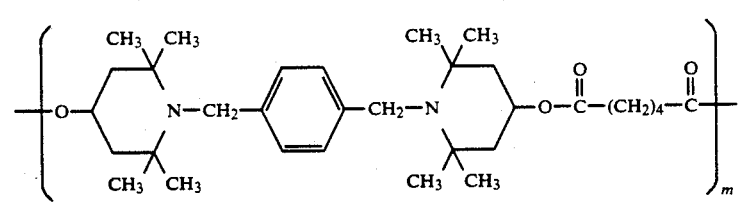
88)
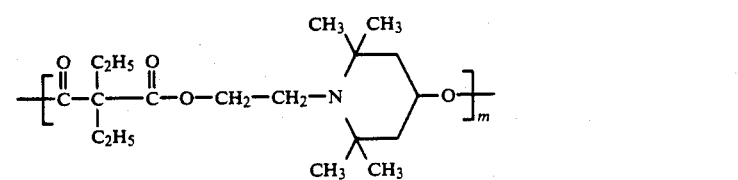
89)
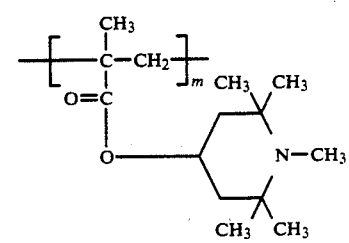
90)

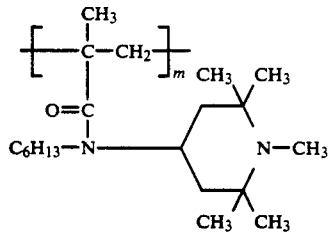

91)

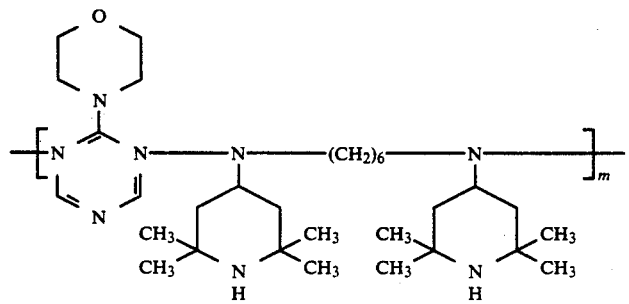

92)

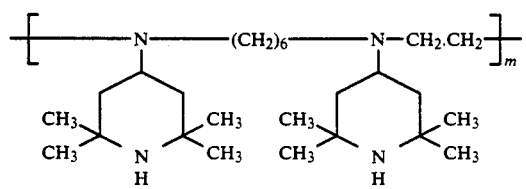

93)

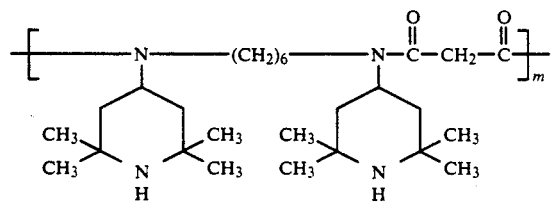

94)

Of these classes, a), d), e) and f) are particularly preferred, in particular the compounds 10, 13, 14, 23, 24, 28, 29, 63, 65, 75, 77, 81, 84 and 92.

These sterically hindered amines are known compounds and many are commercially available. It is also possible to use two different sterically hindered amines, for example one of low molecular weight and one of higher molecular weight, as described in U.S. Pat. No. 4,692,486.

The zinc compound used as component c) may be an organozinc compound, for example the zinc salt of a carboxylic acid, sulfonic acid, phosphonic acid, phosphorous acid or phosphinic acid, or the zinc salt of a phenol or a zinc chelate, for example the enolate of a 1,3-diketo compound. Component c) may alternatively be an inorganic zinc compound, for example an oxide, hydroxide, carbonate, basic carbonate, phosphate, phosphite, sulfate, chloride, fluoride or hypophosphite.

c) is preferably the zinc salt of a $C_1$-$C_{22}$carboxylic acid, of a $C_6$-$C_{18}$phenol or of a $C_5$-$C_{30}$-1,3-diketone. The carboxylic acid may be a saturated or unsaturated aliphatic or cycloaliphatic carboxylic acid or an aromatic or aromatic-aliphatic carboxylic acid. Aminic acids and derivatives thereof are also suitable.

Examples are formic acid, acetic acid, propionic acid, butyric acid, caproic acid, 2-ethylhexanoic acid, caprylic acid, lauric acid, myristic acid, enanthic acid, neodecanoic acid, palmitic acid, stearic acid, isostearic acid, 12-hydroxystearic acid, oleic acid, behenic acid, montanic acid, benzoic acid, chlorobenzoic acid, p-tert-butylbenzoic acid, p-dodecylbenzoic acid, salicylic acid, 3,4-di-tert-butyl-4-hydroxybenzoic acid, toluic acid, dimethylbenzoic acid, p-dimethylaminobenzoic acid, thioglycolic acid, lactic acid, abietic acid, β-mercaptopropionic acid, β-dodecylmercaptopropionic acid, phenylacetic acid and monoesters and monoamides of dicarboxylic acids. Zinc salts of long-chain α-aminocarboxylic acids and N-acylamino acids, for example N-stearoylglycine, are also suitable for this purpose.

Examples of $C_6$-$C_{18}$phenols are phenol, cresol, xylenol, 4-tert-butylphenol, 4-nonylphenol, 4-dodecylphenol, 4-chlorophenol and 2-hydroxybiphenyl.

The $C_5$-$C_{30}$-1,3-diketones are described by the formula VII (see below). Examples are acetylacetone, butanoylacetone, benzoyl-6-hydroxyhexamoylmethane, stearoylacetone, lauroylacetone, benzoylacetone, dibenzoylmethane, lauroylbenzoylmethane, stearoylbenzoylmethane and bis(4-methylbenzoyl)methane.

c) is preferably the zinc salt of a $C_7$-$C_{20}$carboxylic acid. It is also possible to use mixtures of zinc compounds, for example zinc salts of technical grade carboxylic acid mixtures or technical grade alkylphenol mixtures. Particular preference is given to zinc stearate, zinc laurate, zinc oleate, zinc 2-ethylhexanoate and zinc neodecanoate.

1,3-Dicarbonyl compounds which can be used as component d) are linear or cyclic dicarbonyl compounds. Preference is given to dicarbonyl compounds of the formula VII

in which $R_1$ is $C_1$–$C_{22}$alkyl, $C_5$–$C_{10}$hydroxyalkyl, $C_2$–$C_{18}$alkenyl, phenyl, phenyl which is substituted by OH, $C_1$–$C_4$alkyl, $C_1$–$C_4$alkoxy or halogen, $C_7$–$C_{10}$phenylalkyl, $C_5$–$C_{12}$cycloalkyl, $C_5$–$C_{12}$cycloalkyl which is substituted by $C_1$–$C_4$alkyl, or an —$R_5$—S—$R_6$ or —$R_5$—O—$R_6$ group, $R_2$ is hydrogen, $C_1$–$C_8$alkyl, $C_2$–$C_{12}$alkenyl, phenyl, $C_7$–$C_{12}$alkylphenyl, $C_7$–$C_{10}$phenylalkyl or a —CO—$R_4$ group, $R_3$ is as defined for $R_1$ or is $C_1$–$C_{18}$alkoxy, $R_4$ is $C_1$–$C_4$alkyl or phenyl, $R_5$ is $C_1$–$C_{10}$alkylene, and $R_6$ is $C_1$–$C_{12}$alkyl, phenyl, $C_7$–$C_{18}$alkylphenyl or $C_7$–$C_{10}$phenylalkyl.

These include the hydroxyl-containing diketones of EP-A-346 279 and the oxa- and thiadiketones of EP-A-307 358.

Alkyl $R_1$ and $R_3$ may be, in particular, $C_1$–$C_{18}$alkyl, for example methyl, ethyl, n-propyl, isopropyl, n-butyl, tert-butyl, pentyl, hexyl, heptyl, octyl, decyl, dodecyl or octadecyl.

Hydroxyalkyl $R_1$ and $R_3$ are, in particular, —(CH$_2$)$_n$—OH groups in which n is 5, 6 or 7.

Alkenyl $R_1$ and $R_3$ may be, for example, vinyl, allyl, methallyl, 1-butenyl, 1-hexenyl or oleyl, preferably allyl.

OH—, alkyl-, alkoxy- or halogen-substituted phenyl $R_1$ and $R_3$ may be, for example, tolyl, xylyl, tert-butylphenyl, methoxyphenyl, ethoxyphenyl, hydroxyphenyl, chlorophenyl or dichlorophenyl.

Phenylalkyl $R_1$ and $R_3$ are, in particular, benzyl.

Cycloalkyl or alkylcycloalkyl $R_2$ and $R_3$ are, in particular, cyclohexyl or methylcyclohexyl.

Alkyl $R_2$ may be, in particular, $C_1$–$C_4$alkyl.

$C_2$–$C_{12}$alkenyl $R_2$ may be, in particular, allyl. Alkylphenyl $R_2$ may be, in particular, tolyl. Phenylalkyl $R_2$ may be, in particular, benzyl. $R_2$ is preferably hydrogen.

Alkoxy $R_3$ may be, for example, methoxy, ethoxy, butoxy, hexyloxy, octyloxy, dodecyloxy, tridecyloxy, tetradecyloxy or octadecyloxy.

$C_1$–$C_{10}$alkylene $R_5$ is, in particular, $C_2$–$C_4$alkylene.

Alkyl $R_6$ is, in particular, $C_4$–$C_{12}$alkyl, for example, butyl, hexyl, octyl, decyl or dodecyl. Alkylphenyl $R_6$ is, in particular, tolyl. Phenylalkyl $R_6$ is, in particular, benzyl.

Examples of 1,3-dicarbonyl compounds of the formula VII are acetylacetone, butanoylacetone, heptanoylacetone, stearoylacetone, palmitoylacetone, lauroylacetone, 7-tert-nonylthioheptane-2,4-dione, benzoylacetone, dibenzoylmethane, lauroylbenzoylmethane, palmitoylbenzoylmethane, benzoyl-6-hydroxyhexanoylmethane, stearoylbenzoylmethane, 5-hydroxycapronylbenzoylmethane, tribenzoylmethane, bis(4-methylbenzoyl)methane, benzoyl-p-chlorobenzoylmethane, bis(2-hydroxybenzoyl)methane, 4-methoxybenzoylbenzoylmethane, bis(4-methoxybenzoyl)methane, 1-benzoyl-1-acetylnonane, benzoylacetylphenylmethane, stearoyl-4-methoxybenzoylmethane, bis(4-tert-butylbenzoyl)methane, benzoylformylmethane, benzoylphenylacetylmethane, bis(cyclohexanoyl)methane, di(pivaloyl)methane, methyl, ethyl, hexyl, octyl, dodecyl and octadecyl acetoacetate, ethyl, butyl, 2-ethylhexyl, dodecyl and octadecyl benzoylacetate and ethyl, propyl, butyl, hexyl and octyl stearoylacetate.

Component d) is preferably a compound of the formula VII in which $R_1$ is $C_1$–$C_{18}$alkyl, phenyl, phenyl which is substituted by OH, methyl or methoxy, $C_7$–$C_{10}$phenylalkyl or cyclohexyl, $R_2$ is hydrogen, and $R_3$ is as defined for $R_1$.

The compositions according to the invention preferably comprise 100 parts by weight of component (a), from 0.01 to 3 parts by weight of component (b) and from 0.02 to 4 parts by weight of component (c), in particular 100 parts by weight of component (a), from 0.1 to 2 parts by weight of component (b) and from 0.1 to 2 parts by weight of component (c).

If the composition also contains a 1,3-dicarbonyl compound as component (d), it preferably contains from 0.05 to 1 part by weight, in particular from 0.1 to 0.5 part by weight, of component (d) per 100 parts by weight of component (a). If some of this 1,3-dicarbonyl compound is in the form of a zinc chelate, the amount used is from 0.1 to 2.5 parts by weight.

In addition, the composition may contain further additives which are known and conventional for processing and stabilising chlorine-containing polymers, for example plasticisers, phosphites, metal-free PVC stabilisers, impact modifiers, heat resistance improvers, epoxide compounds, antioxidants, UV absorbers, light stabilisers, pigments, dyes, fillers, solvents, lubricants and flameproofing agents.

However, in addition to the zinc compounds, the composition contains no metal carboxylates, as are frequently used to stabilise chlorine-containing polymers, for example carboxylic acid salts of calcium, magnesium, barium, cadmium or lead, or organotin compounds. However, the composition can contain chelates of the metals calcium, magnesium and barium. These chelates are preferably derived from 1,3-diketones of the formula VII. Particular preference is given to the acetylacetonates of calcium, magnesium and barium. The amounts employed are from 0.05 to 3 parts by weight, in particular from 0.1 to 2 parts by weight, per 100 parts by weight of component a).

Examples of plasticisers are the esters of phthalic acid, adipic acid, azelaic acid, sebacic acid and trimellitic acid, polyesters made from aliphatic diols and dicarboxylic acids, phosphoric acid esters, chloroparaffins and epoxidised fatty acid esters. Further examples are given in "Taschenbuch der Kunststoff-Additive" [Pocketbook of Plastics Additives], R. Gächter, H. Müller, Hanser-Verlag 1983, pages 280–307. The plasticisers may be used in an amount of from 15 to 100 parts by weight, based on 100 parts by weight of the chlorine-containing polymer.

Organic phosphites are known costabilisers for chlorine-containing polymers stabilised by means of metal carboxylates, in particular in combination with stabilisers based on zinc, barium or cadmium. Examples of phosphites of this type are trioctyl phosphite, tridecyl phosphite, tridodecyl phosphite, decyl diphenyl phosphite, triphenyl phosphite, phenyl didecyl phosphite, tris(nonylphenyl) phosphite, trilauryl phosphite, trioctadecyl phosphite, distearyl pentaerythritol diphosphite, 2,4-di-tert-butylphenyl di(dodecyl) phosphite, tris(2,4-di-tert-butylphenyl) phosphite, diisodecyl pentaerythritol diphosphite, bis(2,4-di-tert-butylphenyl) pentaerythritol diphosphite, tristearyl sorbitol triphosphite and 3,9-bis(2,4-di-tert-butylphenoxy)-2,4,8,10-tetraoxa-3,9diphosphaspiro[5.5]undecane.

Examples of metal-free stabilisers for chlorine-containing polymers are aliphatic polyols, such as pentaerythritol, dipentaerythritol, trimethylolpropane, trsi(2-hydroxyethyl) isocyanurate, sorbitol, mannitol and furan; aminocrotonic acid esters; mercaptobenzoic acid esters; dehydracetic acid; 2,4-dihydroxybenzophenone; enol carbonates, as described in EP-A-224 438; aromatic amides, as described in EP-A-122 228 and 174 412; and nitrogen-containing heterocyclic compounds, as described in EP-A-2007, 22 087, 22 749, 41 479, 65 934, 260 226 and 354 179, DE-A-3 048 659 and 3124853, GB-A-2170203 and U.S. Pat. No. 4,908,398. It is also possible to use mercaptobenzoic acid esters, for example i-octyl thiosalicylate.

Examples of impact modifiers are polyacrylates, ethylene-vinyl acetate copolymers and chlorinated polyethylene, and examples of heat resistance improvers are poly(meth)acrylates, acrylate-maleimide copolymers and acrylonitrile-methylstyrene copolymers.

Epoxide compounds are also known stabilisers for chlorine-containing polymers. If they have a suitable structure, they may simultaneously function as plasticisers. Examples of epoxide stabilisers are epoxidised polybutadiene, epoxidised soya oil, epoxidised linseed oil, epoxidised fish oil, epoxidised tallow, methylbutyl and 2-ethylhexyl epoxystearate, tris(epoxypropyl) isocyanurate, epoxidised castor oil, epoxidised sunflower oil, 3-(2-phenoxy)-1,2-epoxypropane, bisphenol A polyglycidyl ether, vinylcyclohexene diepoxide, dicyclopentadiene diepoxide and 3,4-epoxycyclohexylmethyl-3,4-epoxycyclohexane carboxylate. The addition of an epoxide compound of this type, in particular of epoxidised soya oil, is a preferred embodiment of the present invention.

Examples of antioxidants are:

1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-i-butylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol and 2,6-dinonyl-4-methylphenol.

2. Alkylated hydroquinones, for example 2,6-di-tert-butyl-4-methoxyphenol, 2,5-di-tert-butylhydroquinone, 2,5-di-tert-amylhydroquinone and 2,6-diphenyl-4-octadecyloxyphenol.

3. Hydroxylated diphenyl thioethers, for example 2,2'-thiobis(6-tert-butyl-4-methylphenol), 2,2'-thiobis(4-octylphenol), 4,4'-thiobis(6-tert-butyl-3-methylphenol) and 4,4'-thiobis(6-tert-butyl-2-methylphenol).

4. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methylphenyl)dicyclopentadiene and bis[2-(3'-tert-butyl-2'-hydroxy-5'-methylbenzyl)-6-tert-butyl-4-methylphenyl] terephthalate.

5. Benzyl compounds, for example 1,3,5-tris(3,5-di-tert-butyl-4-hydroxybenzyl)-2,4,6-trimethylbenzene, bis(3,5-di-tert-butyl-4-hydroxybenzyl) sulfide, isooctyl 3,5-di-tert-butyl-4-hydroxybenzylmercaptoacetate, bis(4-tert-butyl-3-hydroxy-2,6-dimethylbenzyl)dithiol terephthalate, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, dioctadecyl 3,5-di-tert-butyl-4-hydroxybenzylphosphonate, the calcium salt of monoethyl 3,5-di-tert-butyl-4-hydroxybenzylphosphonate, and 1,3,5-tris(3,5-dicyclohexyl-4-hydroxybenzyl) isocyanurate.

6. Acylaminophenols, for example 4-hydroxylauranilide, 4-hydroxystearanilide, 2,4-bis(octylmercapto)-6-(3,5-di-tert-butyl-4-hydroxyanilino)-s-triazine and octyl N-(3,5-di-tert-butyl-4-hydroxyphenyl)carbamate.

7. Esters of β-(3,5-di-tert-butyl-4-hydroxyphenyl)-propionic acid with monohydric or polyhydric alcohols, for example with methanol, octadecanol, 1,6-hexanediol, neopentyl glycol, thiodiethylene glycol, diethylene glycol, triethylene glycol, pentaerythritol, tris(hydroxyethyl) isocyanurate and N,N'-bis(hydroxyethyl)oxalamide.

8. Esters of β-(5-tert-butyl-4-hydroxy-3-methylphenyl)propionic acid with monohydric or polyhydric alcohols, for example with methanol, octadecanol, 1,6-hexanediol, neopentyl glycol, thiodiethylene glycol, diethylene glycol, triethylene glycol, pentaerythritol, tris(hydroxyethyl) isocyanurate and N,N'-bis(hydroxyethyl)oxalamide.

9. Esters of β-(3,5-dicyclohexyl-4-hydroxyphenyl)-propionic acid with monohydric or polyhydric alcohols, for example with methanol, octadecanol, 1,6-hexanediol, neopentyl glycol, thiodiethylene glycol, diethylene glycol, triethylene glycol, pentaerythritol, tris(hydroxyethyl) isocyanurate and N,N'-bis(hydroxyethyl)oxalamide.

10. Amides of β-(3,5-di-tert-butyl-4-hydroxyphenyl)-propionic acid, for example N,N'-bis(3,5-di-tert-butyl-4-hydroxyphenylpropionyl)hexamethylenediamine, N,N'-bis(3,5-di-tert-butyl-4-hydroxyphenylpropionyl)-trimethylenediamine and N,N'-bis(3,5-di-tert-butyl-4-hydroxyphenylpropionyl)hydrazine.

Examples of UV absorbers and light stabilisers are:

1.2-(2'-Hydroxyphenyl)benzotriazoles, for example the 5'-methyl, 3,5'-di-tert-butyl, 5'-tert-butyl, 5'-(1,1,3,3-tetramethylbutyl), 5-chloro-3',5'di-tert-butyl, 5-chloro-3'-tert-butyl-5'-methyl, 3'-sec-butyl-5'-tert-butyl, 4'-octoxy, 3+,5'-di-tert-amyl and 3',5'-bis(α,α-dimethylbenzyl) derivatives.

2.2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives.

3. Esters of substituted or unsubstituted benzoic acids, for example 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate and hexadecyl 3,5-di-tert-butyl-4-hydroxybenzoate.

4. Acrylates, for example ethyl and isooctyl α-cyano-β,β-diphenylacrylate, methyl α-carbomethoxycinamate, methyl and butyl α-cyano-β-methyl-p-methoxycinamate, methyl α-carbomethoxy-p-methoxycinnamate and N-(β-carbomethoxy-β-cyanovinyl)-2-methylindoline.

5. Oxalic acid diamides, for example, 4,4'-dioctyloxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and the mixture thereof with 2-ethoxy-2'-ethyl-5,4'-di-tert-butyloxanilide, and mixtures of o- and p-methoxy- and of o-and p-ethoxy-disubstituted oxanilides.

The pigments used may be inorganic, organic or metallic. Examples of fillers are chalk, carbon black, graphite, talc, kaolin or silicate minerals. However, the compositions according to the invention do not contain any hydrotalcite compounds.

Lubricants are, in particular, fatty acids and the salts, esters and amides thereof, fatty alcohols, paraffins and polyethylene waxes. Flameproofing agents are, in particular, antimony oxide, aromatic bromine compounds and phosphoric acid esters.

A review on the use of impact modifiers, colorants, fillers, lubricants and flameproofing agents in chlorine-containing polymers, in particular in PVC, is given in "Taschenbuch der Kunststoff-Additive" [Pocketbook of Plastics Additives], R. Gächter, H. Müller, Hanser-Verlag, 1983.

The compositions according to the invention can be prepared in a conventional manner. In general, the stabiliser system is incorporated into the polymer, for which purpose a range of known equipment, for example calenders, mixers, kneaders and the like, exists.

The compositions stabilised in accordance with the present invention can be shaped in a conventional manner. Examples of such processes are calendering, extrusion, injection moulding, sintering and spinning, furthermore extrusion blowing or processing by the plastisol process.

The compositions according to the invention are particularly suitable in the form of rigid formulations for hollow articles (bottles), packaging films (thermoformed films), blown films, crash-pad films (automobiles), tubes, heavy profiles (window frames), projection screen profiles, building profiles, sidings, fittings, office films and equipment casings (computers and domestic appliances).

Other compositions in the form of soft formulations are suitable for wire sheathing, cable insulation, decorative films, roof sheeting, agricultural sheeting, tubes, seal profiles, office films and sheeting for air halls.

Examples of the use of the compositions according to the invention as plastisols are artificial leather, flooring, textile coatings, curtains, coil coatings and underseal for motor vehicles.

Examples of sintered PVC applications of the compositions according to the invention are slush, slush mould and coil coatings.

The examples below illustrate the invention in greater detail. All parts and percentages relate to the weight, unless stated otherwise.

The hindered amines, zinc compounds and 1,3-diketones below are used in the examples:

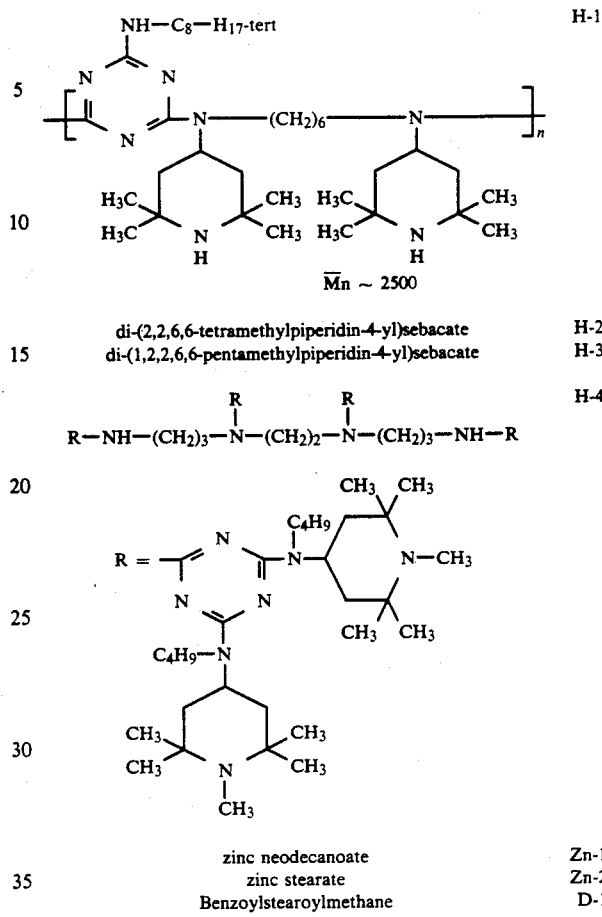

EXAMPLE 1

A semi-rigid PVC composition is prepared in accordance with the following recipe:
100 parts by weight of suspension PVC having a K-value of 64 (Solvic ® 264 GA),
15 parts by weight of dioctyl phthalate,
5 parts by weight of epoxidised soya oil (Reoplast ® 39) and the stabilisers shown in Table 1.

The constituents are homogenised for 5 minutes at 180° C. on mixing rolls, forming a 0.3 mm thick film. Samples are cut from the film and warmed to 180° C. in a test oven (Mathis Thermotester ® LTF-ST). The discoloration which occurs is measured, at regular time intervals, in accordance with ASTM D 1925-70 as the yellowness index (YI). The higher this index, the greater the discoloration.

TABLE 1

| Hindered amine*) | Zinc compound*) | Yellowness index after | | | | | |
|---|---|---|---|---|---|---|---|
| | | 0 | 5 | 10 | 20 | 30 | 40 min |
| — | — | 19 | 64 | 85 | — | — | — |
| 0.3 H-1 | — | 31 | 92 | — | — | — | — |
| 0.3 H-1 | 0.3 Zn-1 | 6 | 26 | 32 | 48 | 71 | 91 |

*)parts per 100 parts of PVC

It can be seen that the hindered amine increases the discoloration, whereas the combination with the zinc compound provides a high level of stabilisation which greatly increases the service life of the PVC.

EXAMPLE 2

A semi-rigid PVC recipe is prepared from the following components:
100 parts by weight of suspension PVC having a K-value of 64 (Solvic ® 264 GA),
17 parts by weight of dioctyl phthalate,
3 parts by weight of epoxidised soya oil (Reoplast ® 39) and the stabilisers shown in Table 2.

The samples are prepared and tested as described in Example 1.

TABLE 2

| Hindered amine*) | Zinc compound*) | Diketone*) | Yellowness index after |   |   |   |   |
|---|---|---|---|---|---|---|---|
|   |   |   | 0 | 5 | 10 | 20 | 30 min |
| — | — | — | 20 | 22 | 31 | 53 | — |
| 0.3 H-2 | — | — | 32 | 53 | 82 | — | — |
| 0.3 H-2 | 0.25 Zn-1 | — | 4 | 7 | 12 | 37 | 92 |
| 0.3 H-2 | 0.25 Zn-1 | — | 4 | 7 | 11 | 30 | 62 |
| 0.3 H-2 | 0.25 Zn-1 | 0.3 D-1 | 1 | 2 | 2 | 8 | 43 |
| 0.3 H-2 | 0.35 Zn-1 | 0.3 D-1 | 1 | 1 | 2 | 6 | 27 |

*)parts per 100 parts of PVC

It can be seen that the stabilising action of the zinc compound (in combination with the hindered amine) is significantly increased by the addition of the diketone.

EXAMPLE 3

A semi-rigid PVC recipe is prepared form the following components:
100 parts by weight of suspension PVC having a K-value of 64 (Solvic ® 264 GA),
20 parts by weight of dioctyl phthalate and the stabilisers shown in Table 3.

The samples are prepared and tested as described in Example 1.

TABLE 3

| Hindered amine*) | Zinc compound*) | Yellowness index after |   |   |   |   |
|---|---|---|---|---|---|---|
|   |   | 0 | 5 | 10 | 20 | 30 | 40 min |
| 0.3 H-1 | 0.3 Zn-1 | 6 | 20 | 26 | 48 | 90 | — |
| 0.3 H-1 | 0.4 Zn-1 | 6 | 18 | 21 | 25 | 56 | — |
| 0.6 H-1 | 0.6 Zn-1 | 6 | 20 | 24 | 40 | 55 | — |
| 0.6 H-1 | 0.8 Zn-1 | 6 | 15 | 19 | 28 | 43 | 57 |

*)parts per 100 parts of PVC

EXAMPLE 4

The basic recipe is the same as in Example 2, but different stabiliser combinations are used. The samples are prepared and tested as described in Example 1. The results are shown in Table 4.

TABLE 4

| Hindered amine*) | Zinc compound*) | Diketone*) | Yellowness index after |   |   |   |   |
|---|---|---|---|---|---|---|---|
|   |   |   | 0 | 5 | 10 | 20 | 30 min |
| — | — | — | 18 | 24 | 76 | — | — |
| 0.3 H-3 | — | — | 14 | 28 | 92 | — | — |
| 0.3 H-3 | 0.25 Zn-1 | — | 2 | 4 | 7 | 22 | 70 |
| 0.3 H-3 | 0.25 Zn-1 | 0.3 D-1 | 0.5 | 1 | 2 | 5 | 56 |
| 0.3 H-3 | 0.35 Zn-1 | — | 1.5 | 4 | 5 | 11 | 26 |
| 0.3 H-2 | 0.35 Zn-1 | 0.3 D-1 | 0.8 | 1 | 1 | 5 | 26 |

*)parts per 100 parts of PVC

This example shows that, at a constant concentration of hindered amine, both increasing the zinc concentration and adding the diketone increases the stabilisation effect. The effect of the diketone is particularly obvious in the first 20 minutes.

EXAMPLE 5

The basic recipe is the same as in Example 3, but different stabiliser combinations are used. The samples are prepared and tested as described in Example 1. The results are shown in Table 5.

TABLE 5

| Hindered amine*) | Zinc compound*) | Yellowness index after |   |   |   |   |   |   |
|---|---|---|---|---|---|---|---|---|
|   |   | 0 | 5 | 10 | 20 | 30 | 40 | 50 | 60 min |
| 0.3 H-1 | 0.35 Zn-1 | 8 | 15 | 26 | 32 | 50 | — | — | — |
| 0.6 H-1 | 0.7 Zn-1 | 7 | 12 | 15 | 24 | 36 | 55 |   | 70 |
| 1.2 H-1 | 1.4 Zn-1 | 8 | 12 | 16 | 28 | 37 | 47 | 57 | 70 |
| 0.3 H-2 | 0.35 Zn-1 | 5 | 12 | 15 | 64 | — | — | — | — |
| 0.6 H-2 | 0.7 Zn-1 | 4 | 6 | 10 | 49 | 86 | — | — | — |
| 1.2 H-2 | 1.4 Zn-1 | 5 | 6 | 9 | 23 | 68 | 90 | — | — |

*)parts per 100 parts per PVC

EXAMPLE 6

A rigid PVC composition is prepared from 100 parts by weight of suspension PVC having a K-value of 60 (Corvic ® 60/104) and 3 parts of an epoxidised soya oil (Reoplast ® 39) and the stabilisers shown in Table 6. The homogenisation is carried out on mixing rolls at 190° C. for 5 minutes, forming a 0.3 mm thick film. The samples are tested as described in Example 1.

TABLE 6

| Hindered amine*) | Zinc compound*) | Di-ketone*) | Yellowness index after |   |   |   |   |
|---|---|---|---|---|---|---|---|
|   |   |   | 3 | 6 | 12 | 18 | 24 | 30 min |
| — | 0.8 Zn-2 | — | 15 | 17 | 20 | 120 | — | — |
| 0.3 H-4 | 0.8 Zn-2 | — | 19 | 22 | 33 | 45 | 50 | 56 |
| 0.3 H-4 | 0.8 Zn-2 | 0.2 D-1 | 9 | 11 | 16 | 26 | 37 | 53 |
| 0.3 H-1 | 0.8 Zn-2 | — | 24 | 28 | 36 | 46 | 56 | 65 |
| 0.3 H-1 | 0.8 Zn-2 | 0.2 D-1 | 8 | 10 | 13 | 19 | 29 | 39 |

*)parts per 100 parts of PVC

This examples shows that the stabilising effect of the zinc salt alone is far inferior to a combination thereof with the hindered amine. The example also shows the strong effect of the diketone on the colour in the first 20 minutes.

What is claimed is:

1. A stabilized chlorine-containing polymer composition comprising
   (a) at least one chlorine-containing polymer,
   (b) an effective stabilizing amount of at least one sterically hindered amine containing a polyalkylpiperidine derivative containing at least one group of formula I $$\text{Formula I:} \quad \begin{array}{c} RCH_2 \quad CH_3 R \\ \diagdown \diagup \\ -N \\ \diagup \diagdown \\ RCH_2 \quad CH_3 \end{array}$$

wherein R is hydrogen, and said derivative is selected from the group consisting of the compounds of formula II

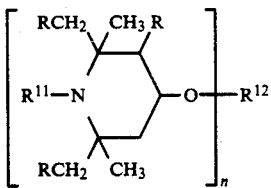

in which R is hydrogen,
R¹¹ is hydrogen or methyl,
n is 2, and
R¹² is the diacyl radical of an aliphatic dicarboxylic acid having 4 to 12 carbon atoms,
the compounds of formula VI

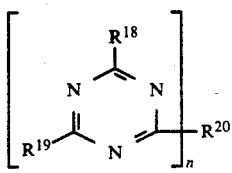

in which n is 4,
R¹⁸ and R¹⁹ are a

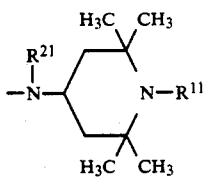

group in which R¹¹ is hydrogen or methyl, and R²¹ is hydrogen or C₁–C₆alkyl, and R²⁰ is the tetravalent radical of an aliphatic tetramine, and
the oligomeric or polymeric polyalkylpiperidine compounds from the series comprising the polyesters and polyaminotriazines, and
(c) an effective stabilizing amount of at least one organic or inorganic zinc compound, but no organic or inorganic calcium, magnesium and/or barium compounds, no organotin compounds, no hydrotalcite compounds and no blowing agents or foaming agents.

2. A polymer composition according to claim 1, containing d) at least one 1,3-dicarbonyl compound.

3. A polymer composition according to claim 1, wherein component a) is a polyvinyl chloride or a copolymer containing at least 80% of vinyl chloride, or a mixture (polyblend) of a polymer of this type with another chlorine-containing or chlorine-free polymer.

4. A polymer composition according to claim 1, wherein component c) is the zinc salt of a C₁–C₂₂carboxylic acid, of a C₆–C₁₈phenol or of a C₅–C₂₂-1,3-diketone.

5. A polymer composition according to claim 4, which additionally contains a chelate of calcium, magnesium or barium or mixture thereof derived from a C₅–C₃₀-1,3-diketone.

6. A polymer composition according to claim 4, wherein c) is the zinc salt of a saturated aliphatic C₇–C₂₀ carboxylic acid.

7. A polymer composition according to claim 2, wherein component d) is a 1,3-dicarbonyl compound of the formula VII

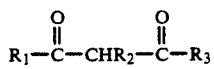

in which R₁ is C₁–C₂₂alkyl, C₅–C₁₀hydroxyalkyl, C₂–C₁₈alkenyl, phenyl, phenyl which is substituted by OH, C₂–C₄alkyl, C₁–C₄alkoxy or halogen, C₇–C₁₀phenylalkyl, C₅–C₁₂cycloalkyl, C₅–C₁₂cycloakyl which is substituted by C₁–C₄alkyl, or an —R₅—S—R₆ or —R₅—O—R₆ group, R₂ is hydrogen, C₁–C₈alkyl, C₂–C₁₂alkenyl, phenyl, C₇–C₁₂alkylphenyl, C₇–C₁₀phenylalkyl or a —CO—R₄ group, R₃ is as defined for R₁ or is C₁–C₁₈alkoxy, R₄ is C₁–C₄alkyl or phenyl, R₅ is C₁–C₁₀alkylene, and R₆ is C₁–C₁₂alkyl, phenyl, C₇–C₁₈alkylphenyl or C₇–C₁₀phenylalkyl.

8. A polymer composition according to claim 7, wherein component d) is a compound of the formula VII in which R₁ is C₁–C₁₈alkyl, C₂–C₁₈thiaalkyl, phenyl, phenyl which is substituted by OH, methyl or methoxy, C₇–C₁₀phenylalklyl or cycloalkyl, R₂ is hydrogen, and R₃ is as defined for R₁.

9. A polymer composition according to claim 1, comprising 100 parts by weight of (a), from 0.01 to 3 parts by weight of (b) and from 0.02 to 4 parts by weight of (c).

10. A polymer composition according to claim 9, comprising 100 parts by weight of (a), from 0.1 to 2 parts by weight of (b) and from 0.1 to 2 parts by weight of (c).

11. A polymer composition according to claim 2, containing from 0.05 to 1 part by weight of (d) per 100 parts by weight of (a).

12. A polymer composition according to claim 2, containing, in addition to components (a) to (c) or (a) to (d), one or more additives from the series comprising plasticisers, phosphites, metal-free PVC stabilisers, impact modifiers, heat resistance improvers, epoxide compounds, antioxidants, UV absorbers, light stabilisers, pigments, dyes, fillers, lubricants and flameproofing agents.

13. A process for stabilizing chlorine-containing polymers against damage by heat and light, by adding
a) at least one sterically hindered amine containing a polyalkylpiperidine derivative containing at least one group of formula I

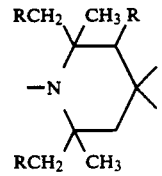

wherein R is hydrogen, and said derivative is selected from the group consisting of the compounds of formula II

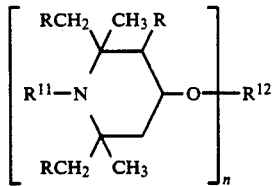

in which R is hydrogen,
$R^{11}$ is hydrogen or methyl,
n is 2, and
$R^{12}$ is the diacyl radical of an aliphatic dicarboxylic acid having 4 to 12 carbon atoms,
the compounds of formula VI

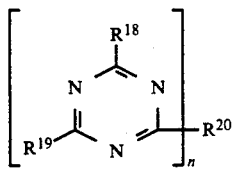

in which n is 4, $R^{18}$ and $R^{19}$ are a

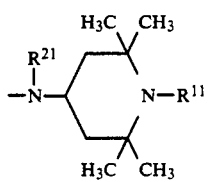

group in which $R^{11}$ is hydrogen or methyl, and $R^{21}$ is hydrogen or $C_1$–$C_6$alkyl, and $R^{20}$ is the tetravalent radical of aliphatic tetramine, and the oligomeric or polymeric polyalkylpiperidine compounds from the series comprising the polyesters and polyaminotriazines, and b) at least one organic or inorganic zinc compound, and, if desired, further additives, but no organic or inorganic calcium, magnesium and/or barium compounds, organotin compounds, hydrotalcite compounds, blowing agents or foaming agents.

14. A process according to claim 13 for stabilising chlorine-containing polymers against damage by heat and light, by adding
a) at least one sterically hindered amine,
b) at least one organic or inorganic zinc compound,
c) at least one 1,3-dicarbonyl compound, and, if desired, further additives, but no organic or inorganic calcium, magnesium and/or barium compounds, organotin compounds, hydrotalcite compounds, blowing agents or foaming agents.

15. A polymer composition according to claim 1, containing in addition to components (a) to (c), one or more additives selected from the group consisting of plasticizers, phosphites, metal-free PVC stabilizers, impact modifiers, heat resistance improvers, epoxide compounds, antioxidants, UV absorbers, light stabilizers, pigments, dyes, fillers, lubricants, flameproofing agents and mixtures thereof.

16. A polymer composition according to claim 2, containing in addition to components (a) to (d), one or more additives selected from the group consisting of plasticizers, phosphites, metal-free PVC stabilizers, impact modifiers, heat resistance improvers, epoxide compounds, antioxidants, UV absorbers, light stabilizers, pigments, dyes, fillers, lubricants, flameproofing agents and mixtures thereof.

* * * * *